US012606376B2

(12) United States Patent (10) Patent No.: US 12,606,376 B2
He et al. (45) Date of Patent: Apr. 21, 2026

(54) SHELF DEVICE, ROBOT AND WAREHOUSING SYSTEM

(71) Applicant: SHANGHAI QUICKTRON INTELLIGENT TECHNOLOGY CO., LTD., Shanghai (CN)

(72) Inventors: Yundi He, Shanghai (CN); Xinhao Wang, Shanghai (CN); Dan Tang, Shanghai (CN)

(73) Assignee: SHANGHAI QUICKTRON INTELLIGENT TECHNOLOGY CO., LTD., Shanghai (CN)

( * ) Notice: Subject to any disclaimer, the term of this patent is extended or adjusted under 35 U.S.C. 154(b) by 537 days.

(21) Appl. No.: 18/190,886

(22) Filed: Mar. 27, 2023

(65) Prior Publication Data

US 2023/0227260 A1 Jul. 20, 2023

Related U.S. Application Data

(63) Continuation of application No. PCT/CN2021/114787, filed on Aug. 26, 2021.

(30) Foreign Application Priority Data

| Sep. 28, 2020 | (CN) | ......................... | 202011039047.0 |
| Sep. 28, 2020 | (CN) | ......................... | 202022174511.9 |
| Sep. 28, 2020 | (CN) | ......................... | 202022174513.8 |

(51) Int. Cl.
  *B25J 5/02* (2006.01)
  *B65G 1/137* (2006.01)

(52) U.S. Cl.
  CPC .................................. *B65G 1/1375* (2013.01)

(58) Field of Classification Search
  CPC .. B65G 1/1375; B65G 1/0407; B65G 1/0471; B65G 1/04; B65G 1/0492; B65G 2201/025; B25J 5/02; B25J 11/00
  See application file for complete search history.

(56) References Cited

U.S. PATENT DOCUMENTS

2019/0084763 A1 3/2019 Beer

FOREIGN PATENT DOCUMENTS

| AT | 519139 B1 * | 9/2018 | ................ B66F 9/07 |
| CN | 101460380 A | 6/2009 | |

(Continued)

OTHER PUBLICATIONS

International Search Report dated Oct. 11, 2021 for International Application No. PCT/CN2021/114787.

(Continued)

*Primary Examiner* — Justin Holmes

(57) ABSTRACT

Disclosed are a shelf device, a robot and a warehousing system. The shelf device comprises: at least two shelves spaced apart, a channel being defined between two adjacent shelves; a track assembly located above the channel and detachably connected to tops of the two adjacent shelves. The track assembly is provided with a track extending in a passing direction of the channel. The track is adapted to be fitted with a robot moving along the channel to limit its position. The stability of the overall structure of the shelf device can be improved and the deformation efficiency of the shelves can be reduced, thereby improving the stability and success rate of the robot to access the material boxes.

19 Claims, 10 Drawing Sheets

(56) References Cited

FOREIGN PATENT DOCUMENTS

| CN | 207174610 | U | * | 4/2018 |
|----|-----------|---|---|--------|
| CN | 110139814 | A | | 8/2019 |
| CN | 111361908 | A | | 7/2020 |
| CN | 211197462 | U | * | 8/2020 |
| CN | 112193694 | A | | 1/2021 |
| CN | 213650797 | U | | 7/2021 |
| CN | 213650798 | U | | 7/2021 |
| DE | 202015107047 | U1 | | 4/2017 |
| JP | H09100007 | A | | 4/1997 |
| JP | 3104782 | B2 | * | 10/2000 |

OTHER PUBLICATIONS

The First Office Action dated Sep. 13, 2021 for Chinese Application No. 202011039047.0.

* cited by examiner

SHELF DEVICE, ROBOT AND WAREHOUSING SYSTEM

CROSS-REFERENCE TO RELATED APPLICATION

The present application is a continuation of International Application No. PCT/CN2021/114787, filed on Aug. 26, 2021, which claims priority to Chinese Patent Application No. 202011039047.0, filed with the Chinese Patent Office on Sep. 28, 2020 and entitled "SHELF DEVICE AND WARE-HOUSING SYSTEM", which is incorporated herein by reference in its entirety. The present application claims priority to Chinese Patent Application No. 202022174511.9, filed with the Chinese Patent Office on Sep. 28, 2020 with the utility model name "SHELF DEVICE AND WARE-HOUSING SYSTEM", which is incorporated herein by reference in its entirety. The present application claims priority to Chinese Patent Application No. 202022174513.8, filed with the Chinese Patent Office on Sep. 28, 2020 with the utility model name "ROBOT AND WAREHOUSING SYSTEM", which is incorporated herein by reference in its entirety.

TECHNICAL FIELD

The present disclosure relates to the field of warehousing technologies, and in particular, to a shelf device, a robot, and a warehousing system.

BACKGROUND

In prior art, a body of a shelf device of the warehousing system is prone to shaking when the robot accesses the material boxes placed at a high position, resulting in the failure of accessing the material boxes, and even causing the robot and the shelf to topple, so there exists potential safety hazards.

SUMMARY

The embodiments of the present disclosure provide a shelf device, a robot and a warehousing system to solve the problems in the related art. The technical solutions are described as follows.

In a first aspect, an embodiment of the present disclosure provides a shelf device, including: at least two shelves spaced apart, a channel being defined between two adjacent shelves; and a track assembly located above the channel and detachably connected to tops of the two adjacent shelves, the track assembly being provided with a track extending in a passing direction of the channel, and the track being adapted to be fitted with a robot moving along the channel to limit its position.

In an implementation, the track assembly includes two track walls disposed opposite to each other, and the two track walls extend in the passing direction of the channel respectively to define the track; and a top of the robot is adapted to be located between the two track walls and is slidably fitted with the two track walls.

In an implementation, the track assembly includes: lateral bars extending in the passing direction of the channel, wherein two lateral bars are disposed opposite to each other in a direction perpendicular to the passing direction of the channel, and side surfaces of the two lateral bars facing each other form the track walls respectively; and vertical bars, wherein upper ends of the vertical bars are connected with the lateral bars, and lower ends of the vertical bars are detachably connected with the shelves.

In an implementation, each lateral bar includes a first bending portion and a second bending portion, the first bending portion is supported on an upper end of respective vertical bar, and a side surface of the second bending portion forms a respective track wall.

In an implementation, each shelf includes support bars extending in a vertical direction, and lower ends of the vertical bars are inserted into and fitted with upper ends of the support bars respectively.

In an implementation, a connecting hole is provided on each vertical bar, a plurality of positioning holes that are spaced apart from each other in the vertical direction are provided on a wall body of each support bar, and the connecting hole is aligned with one of the plurality of positioning holes, so that a limiting member is connected with the connecting hole through the one of the plurality of positioning holes.

In an implementation, the track assembly further includes longitudinal bars, each being connected with the two lateral bars, wherein a plurality of longitudinal bars are spaced apart in the passing direction of the channel.

In an implementation, portions of the two track walls adjacent to end portions are respectively constructed as arc walls.

In an implementation, each shelf includes a first partition and a second partition spaced apart in a vertical direction, the first partition is located above the second partition, and the first partition defines a storage layer and the second partition defines a temporary storage layer.

In a second aspect, an embodiment of the present disclosure provides a robot, including: a mobile chassis movable along a channel of a shelf device; and a bracket disposed on the mobile chassis, a sliding assembly being provided on a top of the bracket and being adapted to be fitted with a track of the shelf device to be limited in position.

In an implementation, the sliding assembly is provided with pulleys, and two pulleys are fitted in a rolling manner with two track walls of the track, respectively.

In an implementation, a rotation axis of each pulley is disposed in a vertical direction.

In an implementation, the sliding assembly includes: a fixing portion, comprising two fixing lugs, which are connected with two opposite sides of the top of the bracket, respectively; and sliding portions, wherein two sliding portions are respectively disposed on two opposite sides of the fixing portion, each sliding portion includes a mounting base and the pulley, and the pulley is rotatably disposed on the mounting base.

In an implementation, an elastic reset portion is provided between each of the two sliding portions and the fixing portion to make the sliding portion retractable relative to the fixing portion.

In an implementation, the elastic reset portion includes: a shaft fixing member located on a side of the fixing portion; a sliding shaft fixed to the shaft fixing member, the mounting base being slidably disposed on the sliding shaft; and an elastic member sleeved onto the sliding shaft, a first end of the elastic member being abutted against the mounting base, and a second end of the elastic member being abutted against the shaft fixing member In an implementation, one sliding assembly is provided and is centered in the length direction on top of the bracket.

In an implementation, a plurality of sliding assembly are provided and are spaced apart in the length direction on top of the bracket.

In an implementation, the robot further includes a carrying portion provided on the bracket and moving in a vertical direction relative to the bracket.

In a third aspect, an embodiment of the present disclosure further provides a warehousing system, including the shelf device according to any of the above embodiments of the present disclosure and/or the robot according to any of the above embodiments of the present disclosure.

The technical solutions of the embodiments of the present disclosure can achieve the following advantages or beneficial effects. On one hand, the stability of the overall structure of the shelf device can be improved, and the probability of the deformation of the shelves can be reduced, thereby the stability and success rate of the robot to access the material boxes can be improved. On the other hand, the moment exerted onto the fixed area between the shelves and the ground when the shelves are subjected to an external force can be reduced, thereby the probability of toppling of the shelves can be reduced, and the safety of the shelf device can be ensured. On the another hand, the impact of the height of the shelves on the toppling probability can be reduced to a certain extent, so there is no need to restrict the height of the shelves, thereby improving the storage capacity of the shelves. Furthermore, the stability of the shelves can be improved without fixing the tops of the shelves to the ceiling of the warehouse, thereby reducing the difficulty in installing the shelf device into the warehouse; and the shelves can be applied to warehouses of various heights, thus improving the applicable range of shelf device. In addition, by providing a track that plays a limiting effect on the position of the robot, on the track assembly, the probability of shaking or toppling sideways of the robot during moving along the channel can be reduced, thus the success rate of the robot to access the material boxes can be improved and the probability of the toppling of the shelves together with the robot due to the toppling of the robot can be reduced, thereby improving the stability of the robot to move along the channel and to access the material boxes.

The foregoing description is only for the purpose of the specification and is not intended to restrict the present disclosure in any way. In addition to the schematic aspects, embodiments and features described above, further aspects, embodiments and features of the present disclosure will be easily understood in conjunction with the accompanying drawings and the following detailed description.

BRIEF DESCRIPTION OF THE DRAWINGS

In the drawings, unless otherwise specified, the reference numerals in the same drawings represent the same or similar components or elements. These drawings are not necessarily drawn to scale. It should be understood that these drawings only describe some embodiments disclosed according to the present disclosure, and should not be regarded as limiting the scope of the present disclosure.

Figure 1:
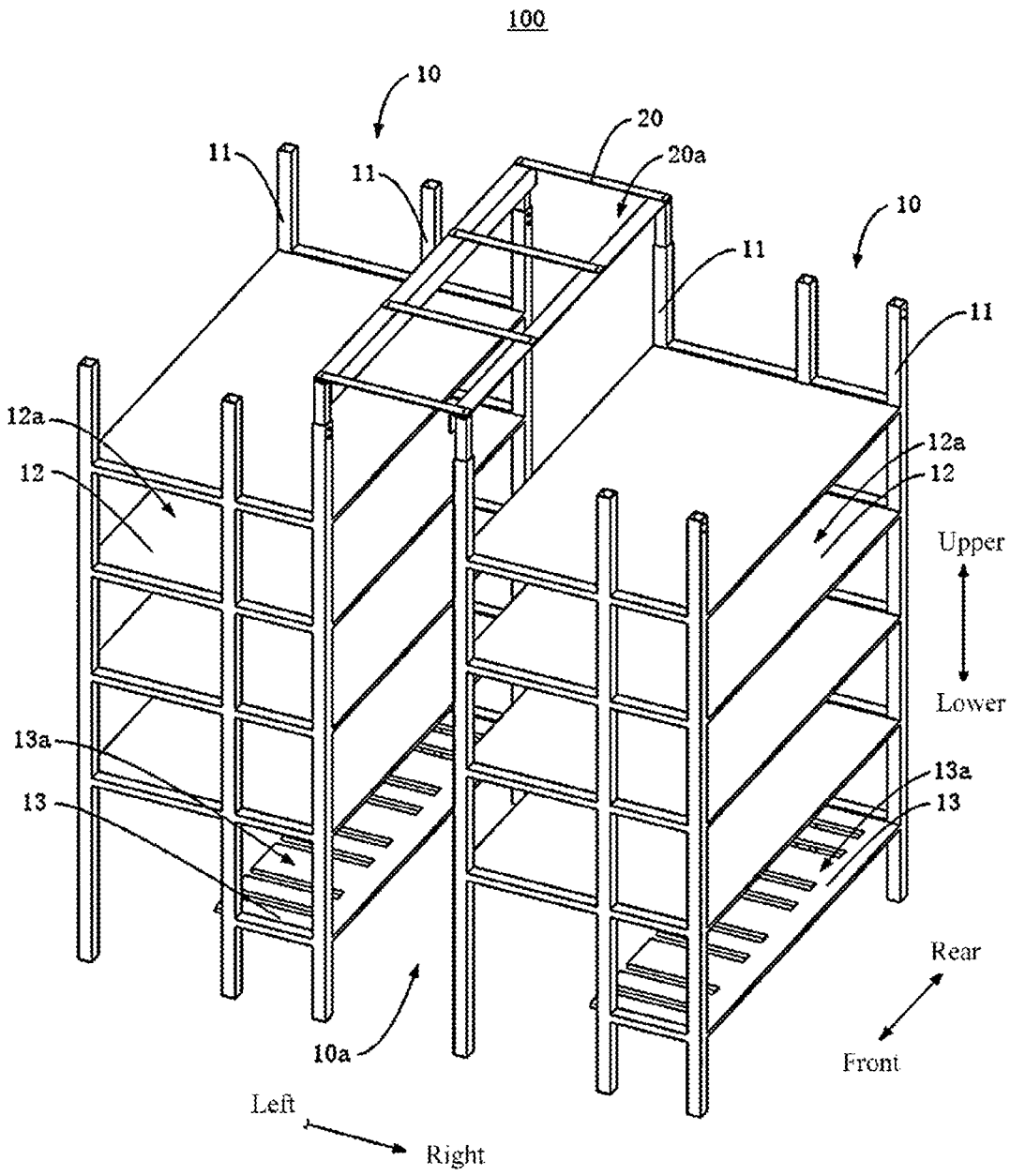
FIG. 1 shows a schematic structural diagram of a shelf device according to an embodiment of the present disclosure.

DESCRIPTION OF REFERENCE NUMERALS warehousing system 1;
shelf device 100;
shelf 10; channel 10*a*; support bar 11; first partition 12; storage layer 12*a*; second partition 13; temporary storage layer 13*a*; limiting member 14;
track assembly 20; track 20*a*; lateral bar 21; first bending portion 211; second bending portion 212; track wall 212*a*; vertical bar 22; longitudinal bar 23;
robot 200;
mobile chassis 30;
bracket 40;
sliding assembly 50; fixing portion 51; fixing lug 511; siding portion 52; mounting seat 521; pulley 522; elastic reset portion 53; shaft fixing member 531; sliding shaft 532; elastic member 533;
carrying portion 60; and
box conveying robot 300.

DETAILED DESCRIPTION

Only some exemplary embodiments are briefly described below. As a person skilled in the art may realize, the described embodiments may be modified in various different ways without departing from the essence or scope of the present disclosure. Therefore, the drawings and description are regarded as illustrative and not restrictive in nature.

The shelf device 100 according to an embodiment of the present disclosure will be described below with reference to FIG. 1 to FIG. 5. The shelf device 100 according to the embodiment of the present disclosure may be used to store material boxes for holding the goods.

As shown in FIG. 1, the shelf device 100 includes the shelves 10 and a track assembly 20.

Specifically, at least two shelves spaced apart are provided, and a channel 10*a* is defined between two adjacent shelves 10. The track assembly 20 is located above the channel 10*a* and is detachably connected to tops of the two adjacent shelves 10. The track assembly 20 is provided with a track 20*a* extending in a passing direction of the channel 10*a*. The track 20*a* is adapted to be fitted with a robot 200 moving along the channel 10*a* to limit its position.

In an example, two shelves 10 are provided, and the two shelves are arranged side by side and are spaced apart in a direction parallel to a width direction of the shelves 10 (i.e., a left-right direction in the figures), and the channel 10*a* is formed in an area between the two shelves 10. It can be understood that the passing direction of the channel 10*a* is the movement direction of robot 200 along the channel 10*a*. The passing direction of the channel 10*a* may be its length direction, and the length direction of the channel 10*a* is parallel to a length direction of the shelf 10 (i.e., a front-rear direction in the figure). The track assembly 20 is disposed above the channel 10*a* and connected with the tops of the two shelves 10 respectively, so that the track assembly 20 and the two shelves 10 form an integral structure.

Therefore, On one hand, the stability of the overall structure of the shelf device 100 can be improved and the probability of toppling of the shelves 10 can be reduced; on the other hand, it enables the track assembly 20 to keep away from the robot 200, thereby ensuring that the robot 200 moves smoothly along the channel 10*a*.

In an example, the robot 200 is adapted to move in the front-rear direction in the channel 10*a*, and is used to transfer the material boxes stored on the shelves 10 away from the shelves 10 or to transfer the material boxes to the shelves 10. The track 20*a* of the track assembly 20 extends in the length direction of the channel 10*a*, and the top of the robot 200 may be located inside the track 20*a*, so that the top of the robot 200 is fitted with the track 20*a* to limit its position. In addition, when the robot 200 moves along the channel 10*a*, the top of the robot 200 may be slidably fitted with the track 20*a*.

Preferably, in the process of the robot 200 moving along the channel 10*a*, the top of the robot 200 keeps be fitted with the track 20*a* to limit its position all the time.

Therefore, in the process of robot 200 moving along the channel 10*a*, by means of the limiting effect of the track 20*a* of the track assembly 20 on the position of the top of the robot 200, it can prevent the robot 200 from toppling toward either side of the channel 10*a* in the width direction, ensuring the stability of the robot 200 during moving.

It should be stated that, in order to ensure the occupation efficiency of warehousing system 1, that is, in order to improve the storage capacity of shelf device 100 as possible, the height of the shelves 10 is required to be larger to provide multiple storage layers 12*a* on the shelves 10. Accordingly, in order to ensure that the robot 200 can access the material boxes placed on the uppermost storage layer 12*a* of the shelves 10, the height of the robot 200 is adapted to be approximately the same as that of the shelves 10. Therefore, the higher the height of a single shelf 10 and a single robot 200, the higher the probability of toppling.

In the shelf device of the prior art, a single shelf has poor stability, and is prone to be deformed with the passage of time, thus affecting the success rate of the robot to access the material boxes. Secondly, since the shelf is fixedly connected only to the ground, when the robot topples to collide with the shelf, a large moment will be exerted on the fixed area between the shelf and the ground, resulting in the shelf being prone to topple. In addition, in order to reduce the probability of toppling of the robot and shelf, it is necessary to restrict the height of robot and shelf, thus restricting the storage capacity of the shelves.

In the shelf device 100 according to the embodiment of the present disclosure, by providing the track assembly 20 located above the channel 10*a* on the tops of the two shelves 10, an integral structure is formed between the track assembly 20 and the two shelves 10. Therefore, On one hand, the stability of the overall structure of the shelf device 100 can be improved, and the probability of the deformation of the shelves 10 can be reduced, thereby the stability and success rate of the robot 200 to access the material boxes can be improved; on the other hand, the moment exerted onto the fixed area between the shelves 10 and the ground when the shelves 10 are subjected to an external force can be reduced, thereby the probability of toppling of the shelves 10 can be reduced, and the safety of the shelf device 100 can be ensured; on the another hand, the impact of the height of the shelves 10 on the toppling probability can be reduced to a certain extent, so there is no need to restrict the height of the shelves 10, thereby improving the storage capacity of the shelves 10.

Furthermore, the stability of the shelves 10 can be improved without fixing the tops of the shelves 10 to the ceiling of the warehouse, thereby reducing the difficulty in installing the shelf device 100 into the warehouse; and the shelves 10 can be applied to warehouses of various heights, thus improving the applicable range of shelf device 100.

In addition, by providing the track 20*a* that plays a limiting effect on the position of the robot 200, on the track assembly 20, the probability of shaking or toppling sideways of the robot 200 during moving along the channel 10*a* can be reduced, thus improving the success rate of the robot 200 to access the material boxes, and reducing the probability of the toppling of the shelves 10 together with the robot 200 due to the toppling of the robot 200, thereby improving the stability of the robot 200 to move along the channel 10*a* and to access the material boxes.

Therefore, the shelf device 100 according to the embodiment of the present disclosure has the advantages of stable structure, low probability of the toppling of the shelves 10 and robot 200, small installation difficulty and wide application range.

Figure 2:
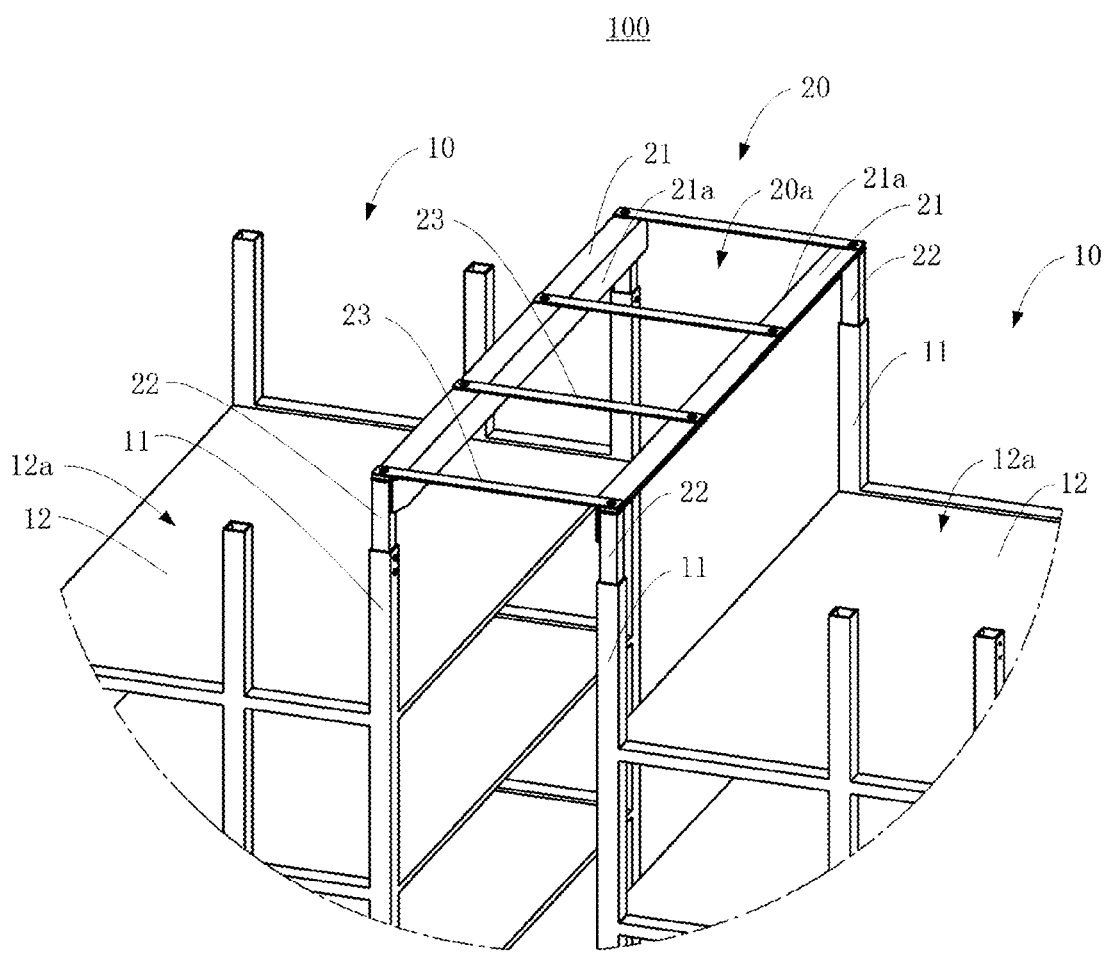
FIG. 2 shows a schematic diagram of a partial structure of the shelf device according to the embodiment of the present disclosure.

In an implementation, as shown in FIG. 2, the track assembly 20 includes two track walls 212*a* disposed opposite to each other, and the two track walls 212*a* extend in the passing direction of the channel 10*a* to define the track 20*a*. The top of the robot 200 is adapted to be located between the two track walls 212*a*, and is slidably fitted with the two track walls 212*a*.

Illustratively, the two track walls 212*a* are disposed opposite to each side in the left-right direction shown in FIG. 1, and each track wall 212*a* extends in the front-rear direction shown in FIG. 1. It should be stated that the distance between the two track walls 212*a* may be equal to the width of the top of the robot 200, so that the two opposite sides of the top of the robot 200 in the left-right direction abuts against the two track walls 212*a* respectively, so that the robot 200 will remain upright all the time and prevent the robot 200 from toppling. Alternatively, the distance between the two track walls 212*a* may be slightly greater than the width of the top of the robot 200, that is, when the robot 200 is in an upright state, the two sides of the top of the robot 200 in the width direction do not contact with the two track walls 212*a*, respectively. When the robot 200 is inclined at a small angle, one side of the top of the robot 200 that faces the inclining direction contacts with the track wall 212*a* on the corresponding side, to prevent the robot 200 from continuing to toppling.

In an implementation, as shown in FIG. 2, the track assembly 20 includes lateral bars 21 and vertical bars 22. Specifically, the lateral bars 21 extend in the passing direction of the channel 10*a*, and two lateral bars 21 are disposed opposite to each other in a direction perpendicular to the passing direction of the channel 10*a*. The side surfaces of the two lateral bars 21 facing each other form the track walls 212*a* respectively. The upper ends of the vertical bars 22 are connected with the lateral bar 21, and the lower ends of the vertical bars 22 are detachably connected with the shelves 10.

Illustratively, the two lateral bars 21 extend in the front-rear direction shown in FIG. 1, and the two lateral bars 21 are disposed opposite to each other in the left-right direction shown in FIG. 1. The two lateral bars 21 are located above the two shelves 10 respectively, and the side surfaces of the two lateral bars 21 facing each other form the track walls 212a respectively. Two groups of vertical bars 22 may be disposed correspondingly to the two lateral bars 21, and each group of vertical bars 22 includes two vertical bars 22. The upper ends of the two vertical bars 22 in each group are fixedly connected to the two ends of the corresponding lateral bars 21 in the length direction respectively, and the lower ends of the two vertical bars 22 in each group may be detachably connected to the shelves 10 on the corresponding side.

Figure 4:
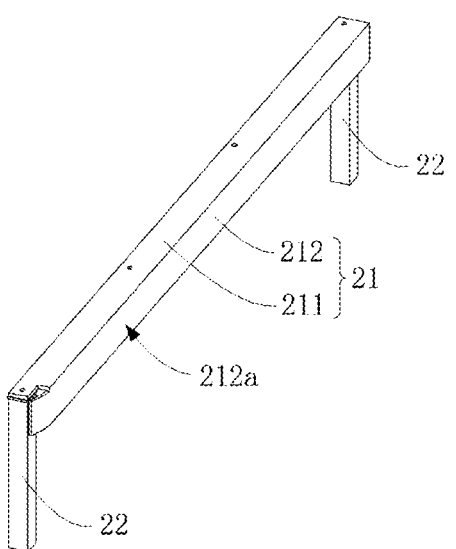
FIG. 4 shows a schematic diagram of a partial structure of a track assembly of the shelf device according to the embodiment of the present disclosure.

Optionally, as shown in FIG. 4, each lateral bar 21 includes a first bending portion 211 and a second bending portion 212, the first bending portion 211 is supported on an upper end of the respective vertical bar 22, and a side surface of the second bending portion 212 forms a respective track wall 212a.

Illustratively, the first bending portion 211 and the second bending portion 212 extend in the passing direction of the channel 10a respectively, and the side edge of the first bending portion 211 is connected with the upper edge of the second bending portion 212. Both the first bending portion 211 and the second bending portion 212 may be constructed as flat plates, the first bending portion 211 is disposed vertically, and the second bending portion 212 is disposed horizontally, so that the plane where the first bending portion 211 is located is perpendicular to the plane where the second bending portion 212 is located. The lower surfaces of the first bending portions 211 of the two lateral bars 21 may be supported on the upper ends of the corresponding groups of vertical bars 22, and the side surfaces of the second bending portions 212 of the two lateral bars 21 facing each other form the track walls 212a, respectively.

Optionally, as shown in FIG. 1 to FIG. 4, each shelf 10 includes support bars 11 extending in a vertical direction, and the lower ends of the vertical bars 22 are inserted into and fitted with the upper end of the support bar 11.

Illustratively, each shelf 10 includes a plurality of support bars 11 spaced apart. Each support bar 11 extends in the vertical direction, and the lower end of each support bar 11 is supported onto the ground, and the upper end of the support bar 11 forms a free end. The lower end of the vertical bar 22 is adapted to be inserted into the upper end of the support bar 11 on a side of the shelf 10 adjacent to the channel 10a. The support bar 11 may be constructed as a hollow tube so that the vertical bar 22 may be inserted into the inside of the support bar 11 through an opening at the upper end of the support bar 11.

In an example, a connecting hole is provided on each vertical bar 22, and a plurality of positioning holes that are spaced apart from each other in the vertical direction are provided on a wall body of each support bar 11. The connecting hole is aligned with one of the positioning holes, so that the limiting member 14 is connected with the connecting hole through the one of the positioning holes.

Specifically, the connecting hole penetrates through the wall body of the vertical bar 22, and the plurality of positioning holes penetrates through the wall body of the support bar 11, respectively. The limiting member 14 may pass through any of the positioning holes from the outside and be fixedly connected with the connecting hole to fix the vertical bar 22 to the support bar 11. The limiting member 14 may be a screw. It can be understood that, by aligning the connecting hole on the vertical bar 22 with the positioning holes at different heights on the support bar 11 respectively and connecting them with the limiting member 14, the depth of the vertical bar 22 inserted into the positioning hole can be adjusted, thereby the height of the track assembly 20 relative to the shelves 10 can be adjusted. In this way, the height of the track assembly 20 relative to the ground can be adjusted according to the height of the robot 200, so that the track 20a of the track assembly 20 can be fitted with the robot 200 to be limited in position. Therefore, the shelf device 100 can be adapted for the robots 200 of different heights, thereby reducing the height restriction on the robot 200, and further improving the applicable range of the shelf device 100.

Figure 3:
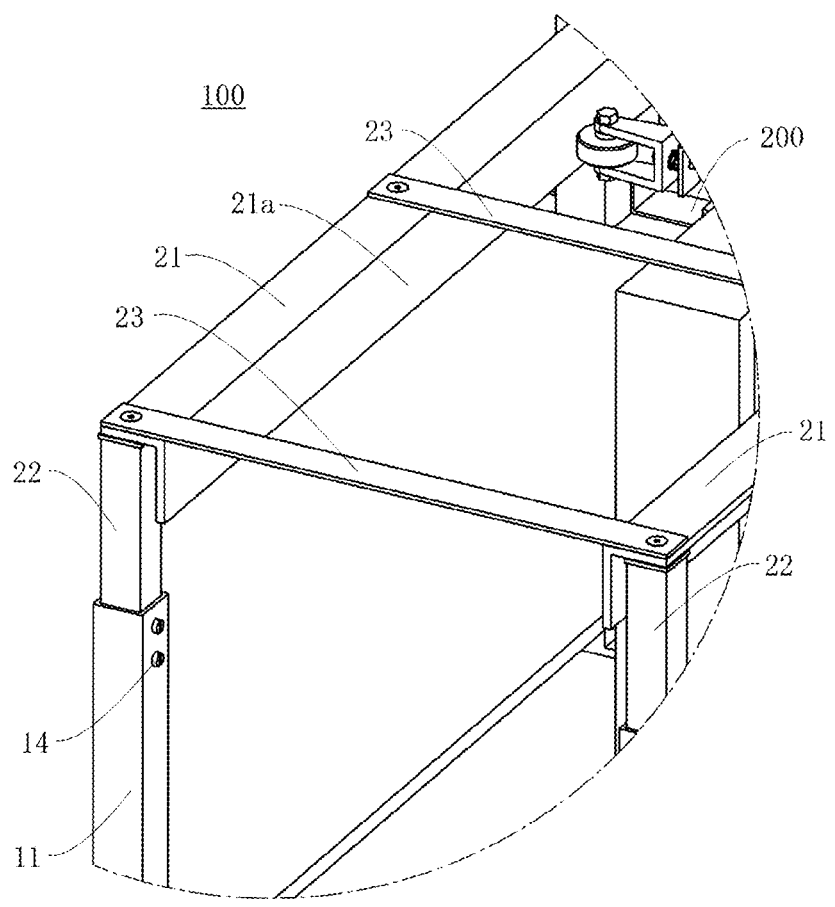
FIG. 3 shows a schematic diagram of a partial structure of the shelf device according to the embodiment of the present disclosure.

Optionally, as shown in FIG. 2 and FIG. 3, the track assembly 20 further includes longitudinal bars 23. Each longitudinal bar 23 is connected with the two lateral bars 21, and a plurality of longitudinal bars 23 are spaced apart in the passing direction of the channel 10a.

Illustratively, the longitudinal bar 23 may extend in the left-right direction as shown in FIG. 1, so that the length direction of the longitudinal bar 23 is perpendicular to the length direction of the lateral bar 21. The longitudinal bar 23 may be constructed as a flat plate, and each longitudinal bar 23 may be supported and fixed on the upper surfaces of the first bending portions 211 of the two lateral bars 21 by screws. The plurality of longitudinal bars 23 are spaced apart at equal intervals in the length direction of the lateral bar 21. Thus, the two lateral bars 21 may be connected through a plurality of longitudinal bars 23 to form an integral structure, thus improving the stability of the overall structural of the track assembly 20.

In an implementation, as shown in FIG. 4, the portions of the two track walls 212a adjacent to end portions thereof are respectively constructed as arc walls.

Illustratively, the portions of the two track walls 212a adjacent to end portions thereof extend outwardly in an arc in a direction toward the end portions respectively, so that the distance between the portions of the two track walls 212a adjacent to end portions thereof gradually increases in the direction toward the end portions. Therefore, when the robot 200 enters the channel 10a, the portions of the two track walls 212a adjacent to end portions thereof can guide the top of the robot 200, thereby improving the adaptability between the top of the robot 200 and the track 20a. Preferably, the portions of the two track walls 212a adjacent to end portions thereof are both constructed as arc walls. Therefore, when the robot 200 enters the channel 10a from either end of the channel 10a, the top of the robot 200 can be guided.

In an implementation, as shown in FIG. 1, each shelf 10 includes a first partition 12 and a second partition 13 which are spaced in the vertical direction. The first partition 12 is located above the second partition 13, wherein the first partition 12 defines a storage layer 12a and the second partition 13 defines a temporary storage layer 13a.

Illustratively, a plurality of first partitions 12 are provided and spaced apart in the vertical direction, and the upper space of the first partition 12 forms the storage layer 12a. The second partition 13 is located below the plurality of first partitions 12, and the space above the second partition 13 forms the temporary storage layer 13a. The robot 200 may be a box transferring robot, which is used to transfer the material boxes placed on the storage layer 12a (i.e., placed on the first partition 12) to the temporary storage layer 13a

(i.e., the second partition 13), or transfer the material boxes placed on the temporary storage layer 13a to the storage layer 12a. In addition, the warehousing system 1 may be further provided with a box conveying robot 300, which is used to convey the material boxes to be in-warehoused to the temporary storage layer 13a, or to convey the material boxes to be ex-warehoused away from the temporary storage layer 13a.

The robot 200 according to an embodiment of the present disclosure will be described below with reference to FIG. 5 to FIG. 10. The robot 200 according to the embodiment of the present disclosure is movable along the channel 10a of the shelf device 100.

Figure 5:
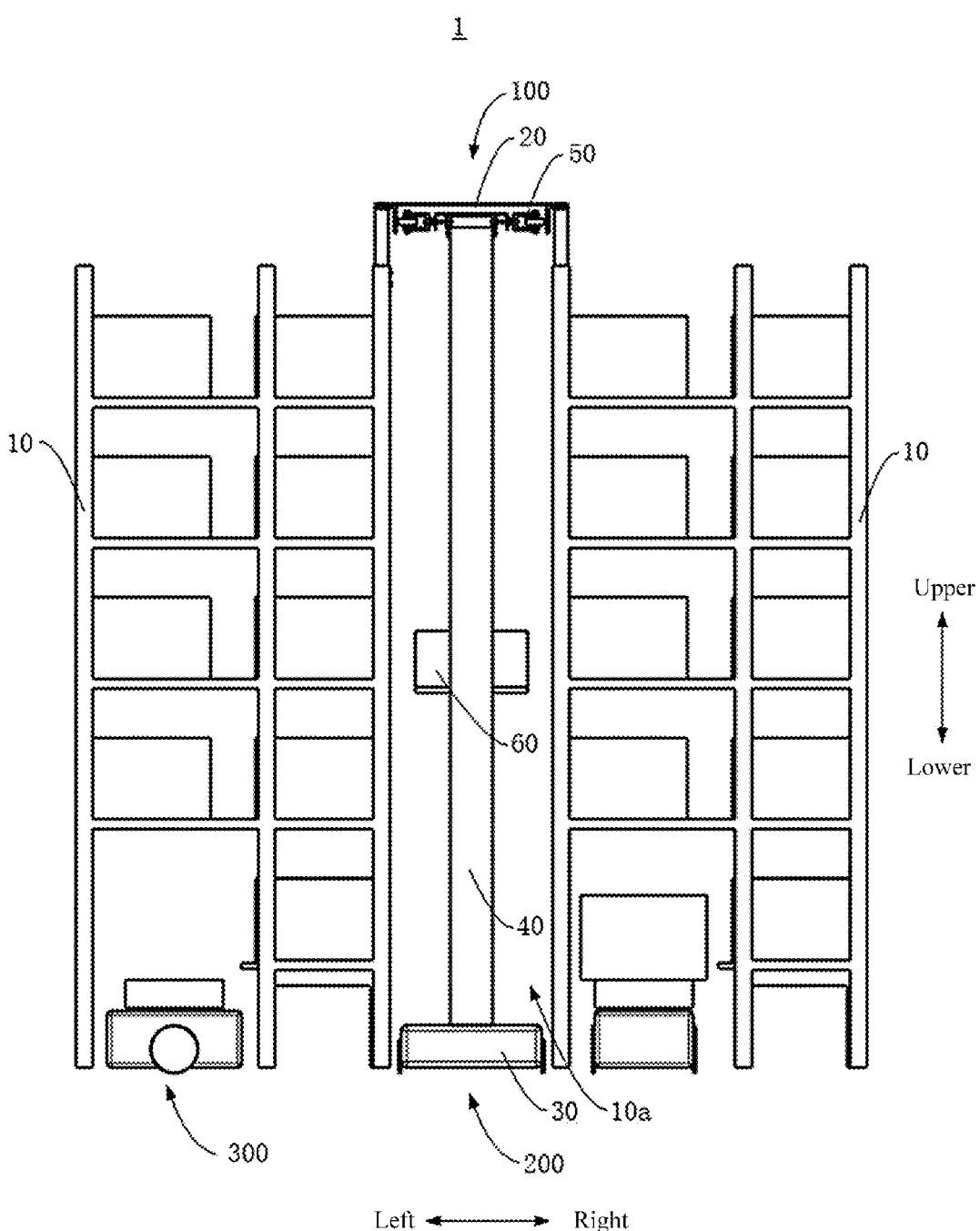
FIG. 5 shows a schematic diagram of cooperation between the shelf device and a robot according to the embodiment of the present disclosure.
Figure 6:
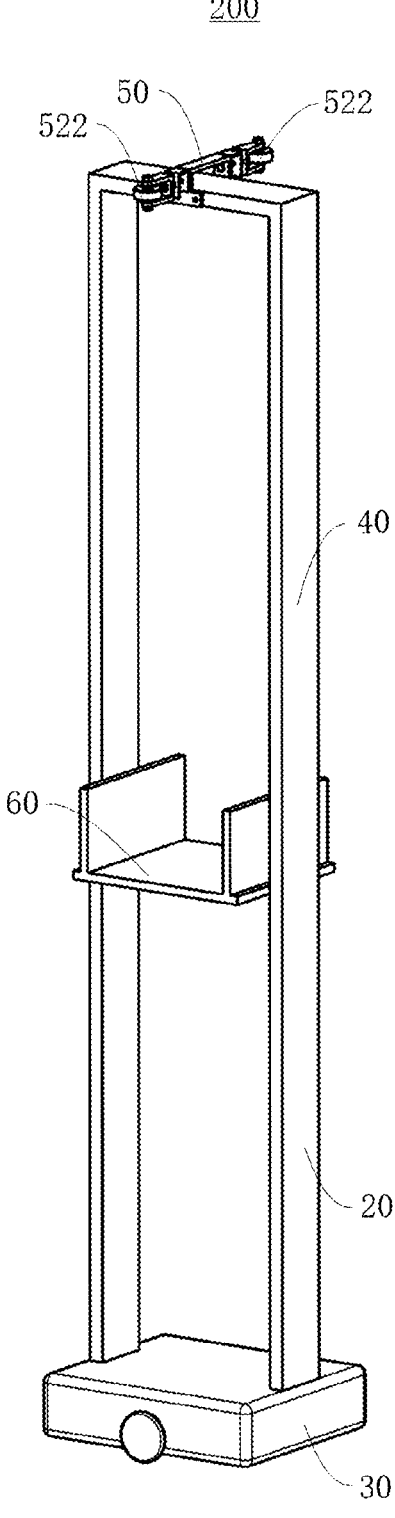
FIG. 6 shows a schematic structural diagram of a robot according to an embodiment of the present disclosure.

As shown in FIG. 5 to FIG. 6, the robot 200 includes a mobile chassis 30 and a bracket 40. Specifically, the mobile chassis 30 is movable along the channel 10a of the shelf device 100. The bracket 40 is disposed on the mobile chassis 30, and a sliding assembly 50 is provided on top of the bracket 40 and is fitted with the track 20a to be limited in position.

Illustratively, as shown in FIG. 6, the robot 200 may be a box transferring robot, which is used to transfer the material boxes on the storage layer 12a of the shelves 10 to the temporary storage layer 13a, or to transfer the goods on the temporary storage layer 13a to the storage layer 12a.

The sliding assembly 50 is disposed on top of the bracket 40, and the sliding assembly 50 is fitted with the track assembly 20 of the shelf device 100 to be limited in position, and the sliding assembly 50 is slidably fitted with the track 20a of the track assembly 20 during the movement of the robot 200.

Preferably, in the process of the robot 200 moving along the channel 10a, the sliding assembly 50 keeps be fitted with the track 20a to be limited in position all the time.

In an implementation, the robot 200 further includes a carrying portion 60 disposed on the bracket 40, and the carrying portion 60 is movable in vertical direction relative to the bracket 40, so that the carrying portion 60 can move to different heights corresponding to different storage layers 12a. The carrying portion 60 may be a telescopic arm device used for accessing the material boxes. The height of the bracket 40 is adapted to be roughly the same as that of the shelf 10, so that the carrying portion 60 can move up to the storage layer 12a on the uppermost layer of the shelves 10.

In the robot 200 according to the embodiment of the present disclosure, by disposing the sliding assembly 50 on top of the bracket 40 and enabling the sliding assembly 50 to be fitted with the track 20a of the track assembly 20 of the shelf device 100 to be limited in position, the probability of shaking or toppling sideways of the robot 200 during moving along the channel 10a can be reduced, thus improving the success rate of the robot 200 to access the material boxes, and reducing the probability of the toppling of the shelves 10 together with the robot 200 due to the toppling of the robot 200, thereby improving the stability of the robot 200 to move along the channel 10a and to access the material boxes.

Figure 7:
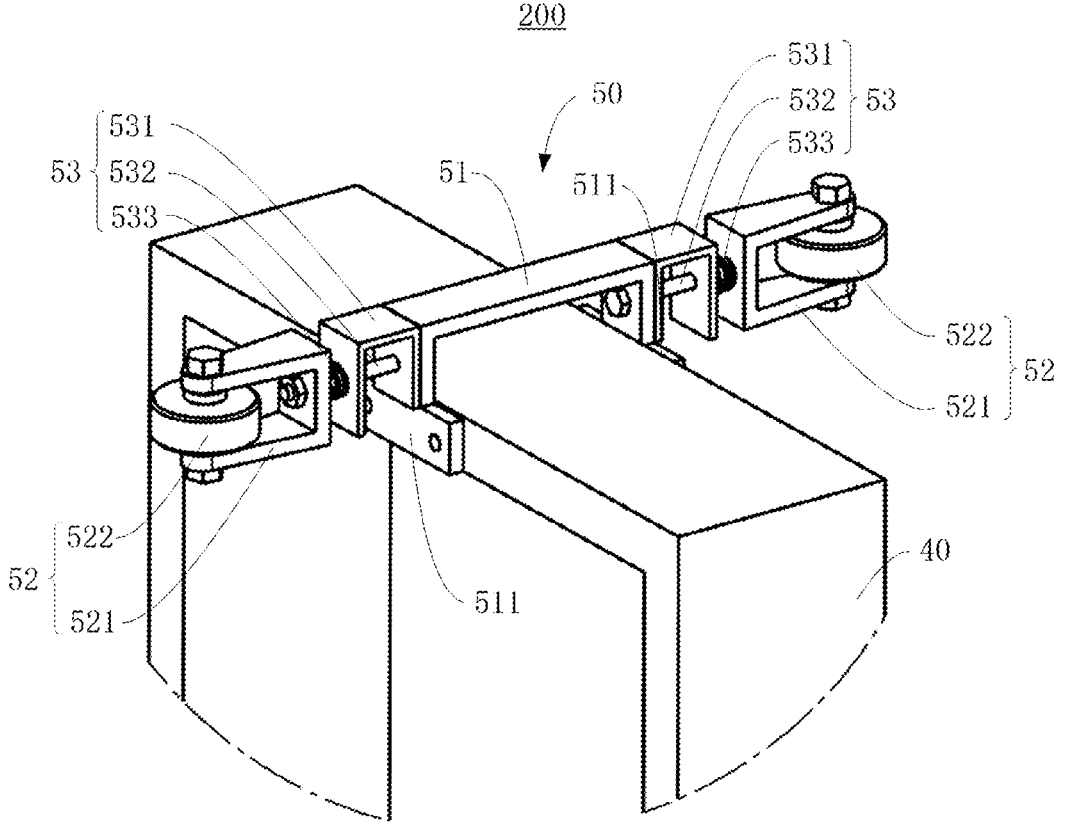
FIG. 7 shows a schematic structural diagram of a sliding assembly of the robot according to the embodiment of the present disclosure.
Figure 8:
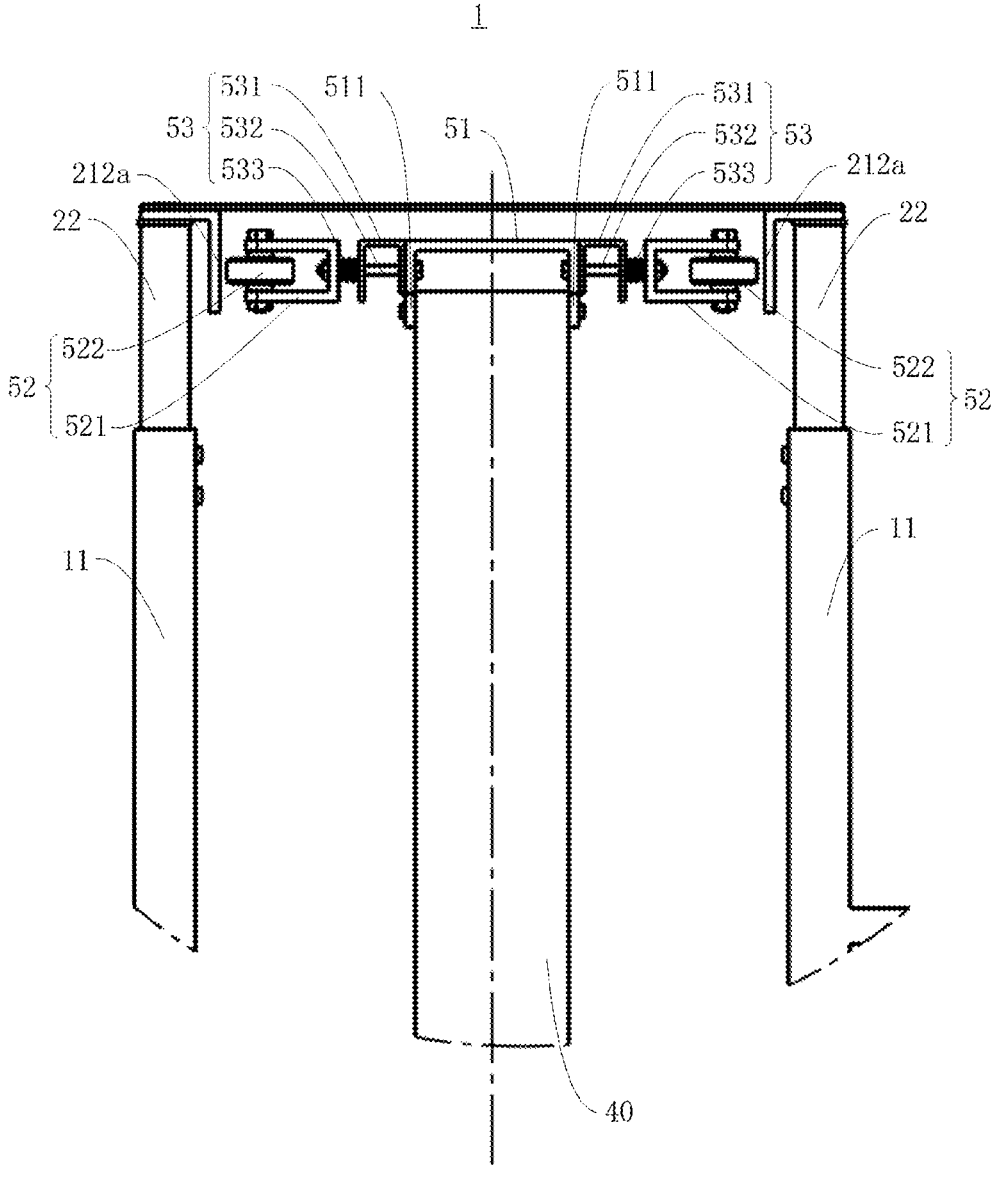
FIG. 8 shows a schematic diagram of connection between the sliding assembly of the robot and the track assembly according to the embodiment of the present disclosure.

In an implementation, as shown in FIG. 6 to FIG. 8, the sliding assembly 50 is provided with pulleys 522, and two pulleys 522 are fitted in a rolling manner with the two track walls 212a of the track 20a.

Illustratively, the two pulleys 522 are disposed opposite to each other in the width direction of the channel 10a, that is, the two pulleys 522 are disposed corresponding to two track walls 212a respectively. A rotation axis of each pulley 522 is disposed in the vertical direction, to make the pulley 522 roll relative to the respective track wall 212a during the movement of the robot 200. Therefore, the friction between the sliding assembly 50 and the track walls 212a can be reduced, and the fitting effect between the sliding assembly 50 and the two track walls 212a can be improved, so that the robot 200 can move more smoothly along the channel 10a.

Optionally, as shown in FIG. 7 and FIG. 8, the sliding assembly 50 includes a fixing portion 51 and sliding portions 52. Specifically, the fixing portion 51 includes two fixing lugs 511, which are respectively connected with the two opposite sides of the top of the bracket 40. Two sliding portions 52 are respectively disposed on two opposite sides of the fixing portion 51. Each sliding portion 52 includes a mounting seat 521 and a pulley 522. The pulley 522 is rotatably disposed on the mounting seat 521.

Illustratively, the two fixing lugs 511 of the fixing portion 51 are constructed as flat plates extending in the vertical direction, and the two fixing lugs 511 are respectively attached to two opposite side surfaces on the top of the bracket 40, and the fixing lugs 511 may be tightly connected with the top of the bracket 40 by screws. Two mounting seats 521 are respectively disposed on two opposite sides of the fixing portion 51. The mounting seat 521 is provided with a fixing shaft disposed in a vertical direction, the pulley 522 is rotatably installed on the fixing shaft to make the rotation axis of the pulley 522 disposed in a vertical direction.

Therefore, the friction between the sliding assembly 50 and the track walls 212a can be reduced, and the fitting effect between the sliding assembly 50 and the two track walls 212a can be improved, so that the robot 200 can move more smoothly along the channel 10a.

Optionally, as shown in FIG. 7 and FIG. 8, an elastic reset portion 53 is disposed between each of the two sliding portions 52 and the fixing portion 51 to make the sliding portion 52 retractable relative to the fixing portion 51.

It can be understood that, the sliding portion 52 being retractable relative to the fixing portion 51 means that the sliding portion 52 is movable relative to the fixing portion 51 in the width direction of the channel 10a, and the elastic reset portion 53 can play a buffering and resetting role on the fixing portion 51. Therefore, when the robot 200 tilts, the elastic reset portion 53 can play a buffering role between the respective sliding portion 52 and the limiting wall, to buffer the force exerted by the sliding portion 52 on the limiting wall, thus reducing the probability of toppling of the track assembly 20 and the shelves 10.

In an example, continue to refer to FIG. 7 and FIG. 8, the elastic reset portion 53 includes a shaft fixing member 531, a sliding shaft 532 and an elastic member 533. Specifically, the shaft fixing member 531 is located on a side of the fixing portion 51. The sliding shaft 532 is fixed to the shaft fixing member 531, and the mounting seat 521 is slidably disposed on the sliding shaft 532. The elastic member 533 is sleeved onto the sliding shaft 532, a first end of the elastic member 533 abuts against the mounting seat 521, and a second end of the elastic member 533 abuts against the shaft fixing member 531.

More specifically, the sliding shaft 532 is disposed to penetrate through the shaft fixing member 531, one end of the sliding shaft 532 protrudes out of the shaft fixing member 531 from one side, and is tightly connected with the fixing lug 511 of the fixing portion 51; the other end of the sliding shaft 532 protrudes out of the shaft fixing member 531 from the other side, and the mounting seat 521 is sleeved onto a portion of the sliding shaft 532 protruding out of the shaft fixing member from the other side, and is slidable relative to the sliding shaft 532. The elastic member 533 may be a spring, which is sleeved onto the portion of the sliding shaft 532 protruding out of the shaft fixing member from the other side, and the two ends of the sliding shaft 532 are connected with the mounting seat 521 and the shaft fixing member 531, respectively.

Figure 9:
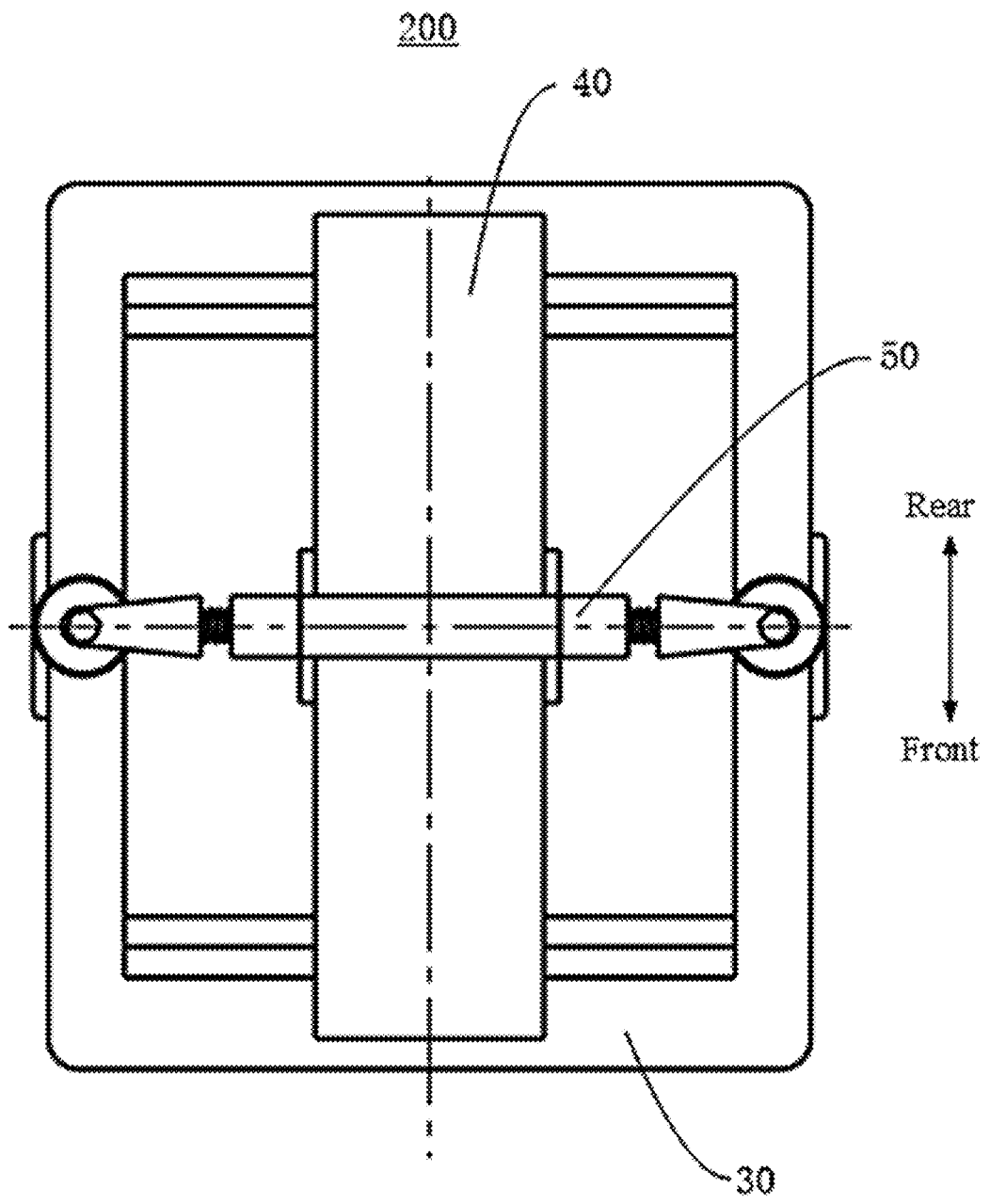
FIG. 9 shows a top view of a robot of a warehousing system according to an embodiment of the present disclosure.
Figure 10:
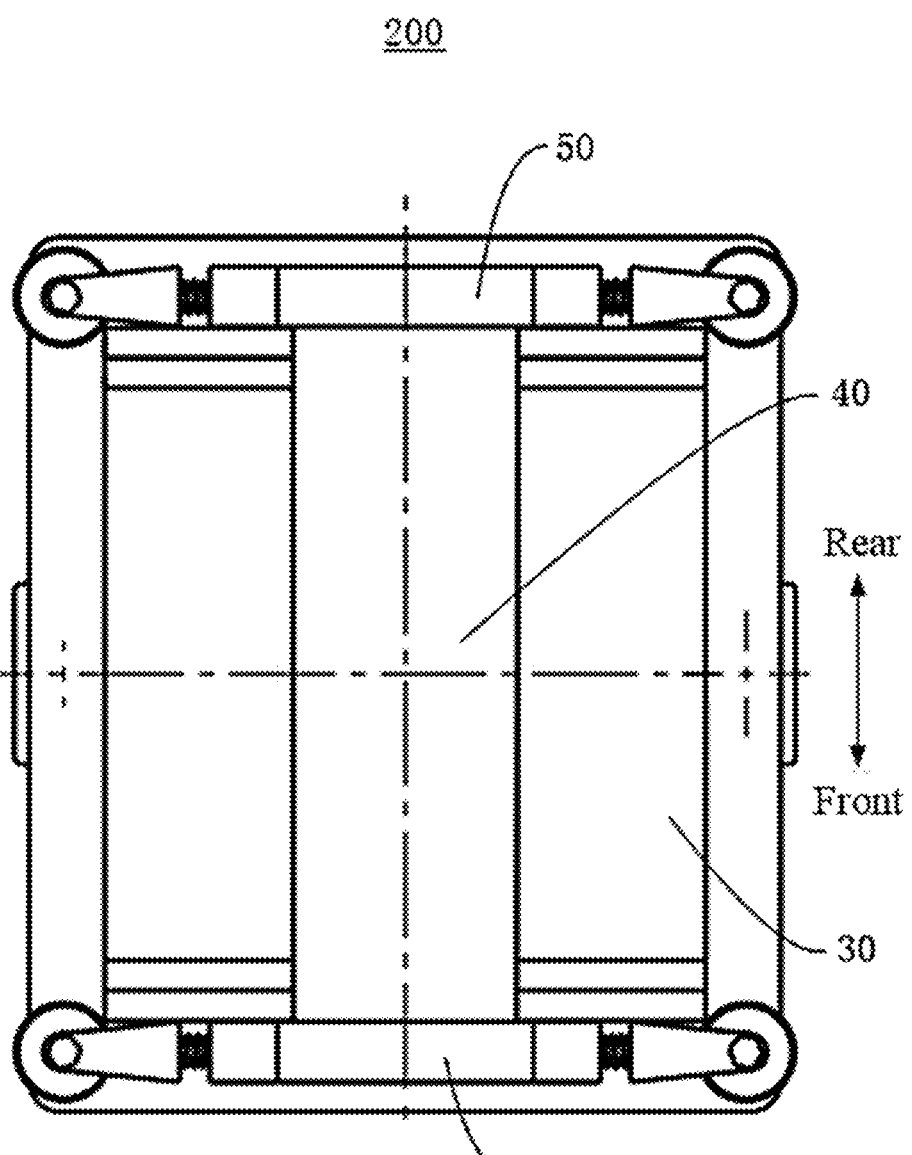
FIG. 10 shows a top view of a robot of a warehousing system according to another embodiment of the present disclosure.

In an implementation, as shown in FIG. 9, one sliding assembly 50 may be provided and be centered in the length direction on the top of the bracket 40, thereby improving the stability of installation of the sliding assembly 50 onto the bracket 40.

In another embodiment, a plurality of sliding assemblies 50 may be provided and be spaced apart in the length direction of the bracket 40, thereby improving the fitting effect of the sliding assemblies 50 and the track 20a of the track assembly 20. For example, in the example shown in FIG. 10, two sliding assemblies 50 may be provided, and the two sliding assemblies 50 are respectively disposed at two ends adjacent to the top of the bracket 40 in the length direction.

The warehousing system 1 according to an embodiment of the present disclosure will be described below with reference to FIG. 11.

Figure 11:
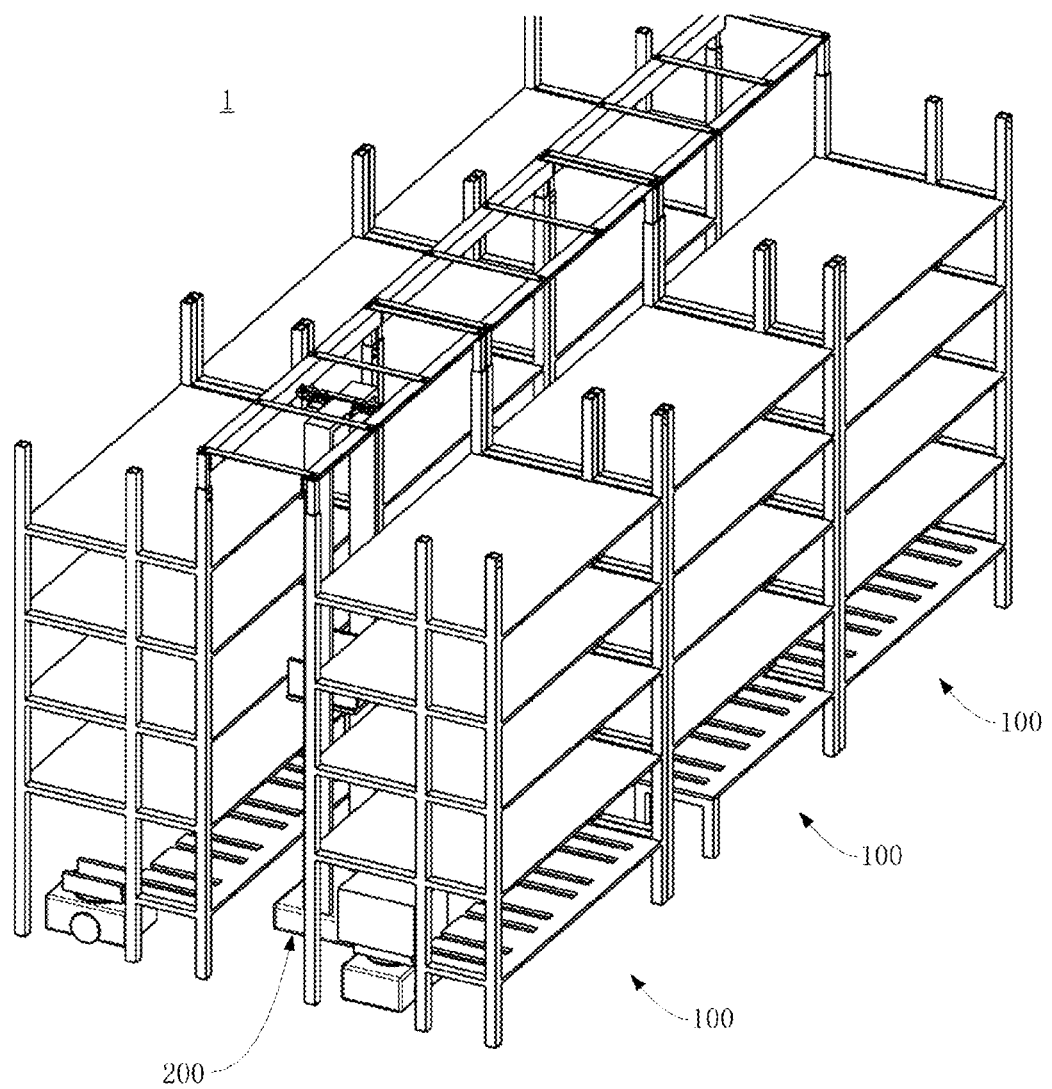
FIG. 11 shows a schematic structural diagram of a warehousing system according to an embodiment of the present disclosure.

As shown in FIG. 11, the warehousing system 1 includes the shelf device 100 according to the above embodiment of the present disclosure and/or the robot 200 according to the above embodiment of the present disclosure.

Illustratively, as shown in FIG. 11, a plurality of shelf devices 100 may be provided and arranged side by side, and the channels 10a of the plurality of shelf devices 100 are successively connected with each other so that a plurality of channels 10a are spliced to form a complete channel. Accordingly, the tracks 20a of the track assemblies 20 of the plurality of shelf devices 100 are connected successively. Therefore, the robot 200 can move along a complete channel formed by splicing the plurality of channels 10a, and the top of the robot 200 can be fitted with the plurality of tracks 20a to limit its position during the movement of the robot 200.

Further, the warehousing system 1 may further include a box conveying robot 300, which is used to convey out the material boxes temporarily stored in the temporary storage layer 13a in the ex-warehousing operation, or to convey the material boxes to the temporary storage layer 13a in the in-warehousing operation.

According to the warehousing system 1 of the embodiment of the present disclosure, by providing the track assembly 20 located above the channel 10a on the tops of the two shelves 10, an integral structure can be formed between the track assembly 20 and the two shelves 10. On one hand, the stability of the overall structure of the shelf device 100 can be improved, the probability of the deformation of the shelves 10 can be reduced, thereby improving the stability and success rate of the robot 200 to access the material boxes; on the other hand, the moment exerted onto the fixed area between the shelves 10 and the ground when the shelves 10 are subjected to an external force can be reduced, thereby reducing the probability of toppling of the shelves 10, and ensuring the safety of the shelf device 100; on the another hand, the impact of the height of the shelves 10 on the toppling probability can be reduced to a certain extent, so there is no need to restrict the height of the shelves 10, thereby improving the storage capacity of the shelves 10.

Furthermore, the stability of the shelves 10 can be improved without fixing the tops of the shelves 10 to the ceiling of the warehouse, thereby reducing the difficulty in installing the shelf device 100 into the warehouse; and the shelves 10 can be applied to warehouses of various heights, thus improving the applicable range of shelf device 100.

In addition, by providing the sliding assembly 50 on the top of the bracket 40 and enabling the sliding assembly 50 to be fitted with the track 20a of the track assembly 20 of the shelf device 100 to be limited in position, the probability of shaking or toppling sideways of the robot 200 during moving along the channel 10a can be reduced, thus improving the success rate of the robot 200 to access the material boxes, and reducing the probability of the toppling of the boxes, and reducing the probability of the toppling of the shelves 10 together with the robot 200 due to the toppling of the robot 200, thereby improving the stability of the robot 200 to move along the channel 10a and to access the material boxes.

Therefore, the shelf device 100 of the warehousing system according to the embodiment of the present disclosure has the advantages of stable structure, low probability of the toppling of the shelves 10 and robot 200, low installation difficulty, wide application range, and the like.

Other components of the warehousing system 1 in the above embodiment may be applied to various technical solutions known to ordinary person in the art now and in the future, which will not be described in detail here.

In the description of this specification, it should be understood that terms "center", "longitudinal", "lateral", "length", "width", "thickness", "up", "down", "front", "rear", "left", "right", "vertical", "horizontal", "top", "bottom", "inner", "outer", "clockwise", "counterclockwise", "axial", "radial", "circumferential", and the like indicate orientations or position relationships based on the orientations or position relationships shown in the drawings, which are only for ease of describing the present disclosure and simplifying the description, rather than indicating or implying that the indicated apparatus or element must have a specific orientation, be configured and operated in a specific orientation, and therefore cannot be understood as a limitation of the present disclosure.

In addition, terms "first" and "second" are used for the purpose of description only, and cannot be understood as indicating or implying relative importance or implicitly indicating the number of technical features indicated. Thus, the features defined by "first" or "second" may explicitly or implicitly include one or more of the features. In the description of the present disclosure, "a plurality of" means two or more, unless specifically defined otherwise.

In the present disclosure, unless specifically defined and limited otherwise, terms "installed", "linked", "connected", "fixed", and the like should be understood in a broad sense, Illustratively, it may be a fixed connection, a detachable connection, or a whole; it may be a mechanical connection, an electrical connection, or a communication; it may be a direct link or an indirect link through an intermediary, and it may be an internal connection between two elements or an interaction relationship between two elements. For a person of ordinary skill in the art, the specific meanings of the foregoing terms in the present disclosure may be understood according to specific circumstances.

In the present disclosure, unless specifically defined and limited otherwise, that the first feature is "above" or "below" the second feature may include the direct contact of the first feature and the second feature, and may further include the contact of the first feature and the second feature through some other features between them, rather than the direct contact between them. Moreover, that the first feature is "above", "over" or "upward" the second feature includes the first feature being directly above and obliquely above the second feature, or it simply means that a horizontal height of the first feature is higher than that of the second feature. That the first feature is "below", "underneath" or "under" the second feature includes the first feature being directly below and obliquely below the second feature, or it simply means that a horizontal height of the first feature is lower than that of the second feature.

The foregoing disclosure provides many different implementations or examples for realizing different structures of the present disclosure. To simplify the content of the present disclosure, components and settings of specific examples are described above. They are certainly only examples, and are not intended to limit the present disclosure. In addition, the present disclosure may repeat reference numerals and/or reference letters in different examples, and this repetition is for the purpose of simplification and clarity, and does not indicate relationships between various implementations and/or settings that are discussed.

What are described above are only specific implementations of the present disclosure, but the protection scope of the present disclosure is not limited to this. Any person skilled in the art may easily think of variations or substitutions within the scope of the technology disclosed in the present disclosure, which shall be covered in the protection scope of the present disclosure. Therefore, the protection scope of the present disclosure should be subject to the protection scope of the claims.

What is claimed is:

1. A shelf device, comprising:
   at least two shelves spaced apart, a channel being defined between two adjacent shelves; and
   a track assembly located above the channel and detachably connected to tops of the two adjacent shelves, the track assembly being provided with a track extending in a passing direction of the channel, and the track being adapted to be fitted with a robot moving along the channel to limit its position, wherein
   the track assembly comprises:
   lateral bars extending in the passing direction of the channel, wherein two lateral bars are disposed opposite to each other in a direction perpendicular to the passing direction of the channel, and the two lateral bars extend in the passing direction of the channel to define the track; and
   vertical bars, wherein upper ends of the vertical bars are connected with the lateral bars, and lower ends of the vertical bars are detachably connected with the shelves.

2. The shelf device of claim 1, wherein the track assembly comprises two track walls disposed opposite to each other, and the two track walls extend in the passing direction of the channel respectively to define the track; and
   a top of the robot is adapted to be located between the two track walls and is slidably fitted with the two track walls.

3. The shelf device of claim 2, wherein side surfaces of the two lateral bars facing each other form the track walls respectively.

4. The shelf device of claim 3, wherein each lateral bar comprises a first bending portion and a second bending portion, the first bending portion is supported on an upper end of respective vertical bar, and a side surface of the second bending portion forms a respective track wall.

5. The shelf device of claim 3, wherein each shelf comprises support bars extending in a vertical direction, and lower ends of the vertical bars are inserted into and fitted with upper ends of the support bars respectively.

6. The shelf device of claim 5, wherein a connecting hole is provided on each vertical bar, a plurality of positioning holes that are spaced apart from each other in the vertical direction are provided on a wall body of each support bar, and the connecting hole is aligned with one of the plurality of positioning holes, so that a limiting member is connected with the connecting hole through the one of the plurality of positioning holes.

7. The shelf device of claim 3, wherein the track assembly further comprises:
   longitudinal bars, each being connected with the two lateral bars, wherein a plurality of longitudinal bars are spaced apart in the passing direction of the channel.

8. The shelf device of claim 2, wherein portions of the two track walls adjacent to end portions are respectively constructed as arc walls.

9. The shelf device of claim 1, wherein each shelf comprises a first partition and a second partition spaced apart in a vertical direction, the first partition is located above the second partition, and the first partition defines a storage layer and the second partition defines a temporary storage layer.

10. A warehousing system, comprising:
    the shelf device of claim 1.

11. A robot, comprising:
    a mobile chassis movable along a channel of a shelf device; and
    a bracket disposed on the mobile chassis, a sliding assembly being provided on a top of the bracket and being adapted to be fitted with a track of the shelf device to be limited in position,
    wherein the sliding assembly is provided with pulleys, and two pulleys are fitted in a rolling manner with two track walls of the track, respectively.

12. The robot of claim 11, wherein a rotation axis of each pulley is disposed in a vertical direction.

13. The robot of claim 11, wherein the sliding assembly comprises:
    a fixing portion comprising two fixing lugs, wherein the two fixing lugs are connected with two opposite sides of the top of the bracket, respectively; and
    sliding portions, wherein two sliding portions are respectively disposed on two opposite sides of the fixing portion, each sliding portion comprises a mounting base and the pulley, and the pulley is rotatably disposed on the mounting base.

14. The robot of claim 13, wherein an elastic reset portion is provided between each of the two sliding portions and the fixing portion to make the sliding portion retractable relative to the fixing portion.

15. The robot of claim 14, wherein the elastic reset portion comprises:
    a shaft fixing member located on a side of the fixing portion;
    a sliding shaft fixed to the shaft fixing member, the mounting base being slidably disposed on the sliding shaft; and
    an elastic member sleeved onto the sliding shaft, a first end of the elastic member being abutted against the mounting base, and a second end of the elastic member being abutted against the shaft fixing member.

16. The robot of claim 11, wherein one sliding assembly is provided and is centered in the length direction on top of the bracket.

17. The robot of claim 11, wherein a plurality of sliding assembly are provided and are spaced apart in the length direction on top of the bracket.

18. The robot of claim 11, further comprising:
    a carrying portion provided on the bracket and moving in a vertical direction relative to the bracket.

19. A warehousing system, comprising the robot of claim 11.

* * * * *